Nov. 6, 1928.
L. R. HESTON ET AL
1,690,111
SAWING MACHINE
Filed April 2, 1925
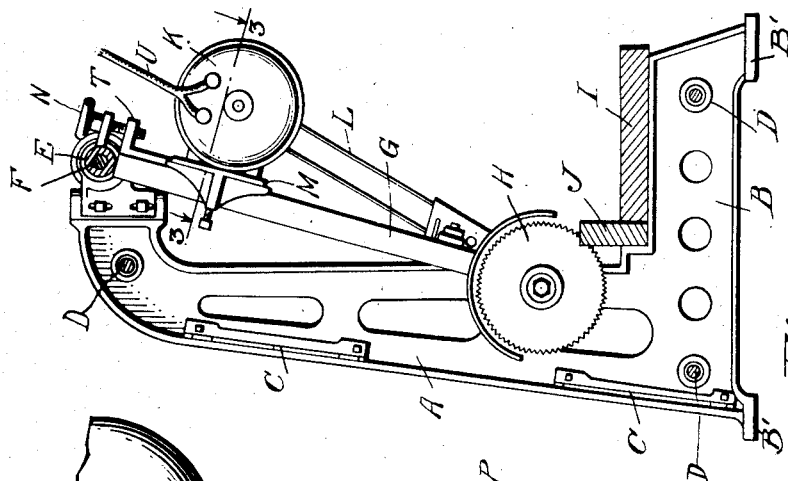
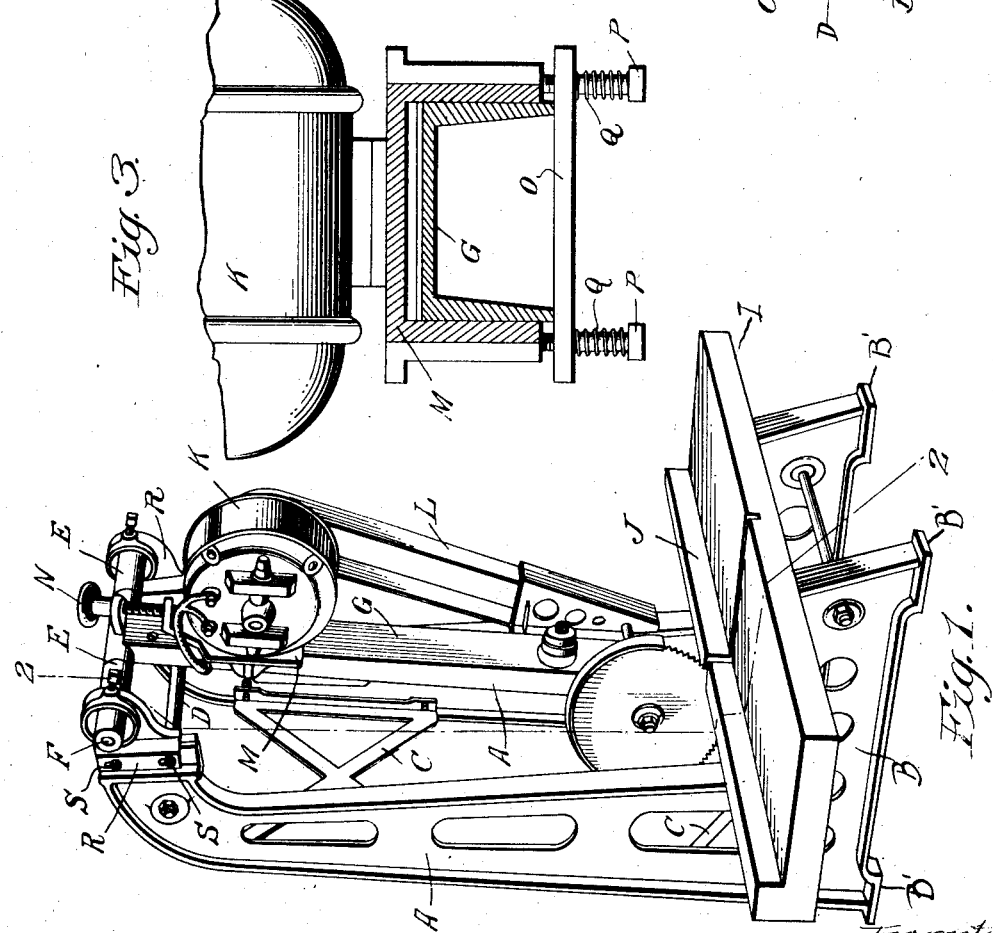
Inventor
Lorenzo R. Heston
Abner L. Anderson Patented Nov. 6, 1928.

1,690,111

UNITED STATES PATENT OFFICE.

LORENZO R. HESTON AND ABNER L. ANDERSON, OF FAIRFIELD, IOWA.

SAWING MACHINE.

Application filed April 2, 1925. Serial No. 20,164.

Our invention relates to portable cross cut sawing machines designed for use mainly when set on benches, or on other suitable and preferably elevated supports, and to be easily and quickly moved from one place to another, where they may be most conveniently used to cross cut pieces of lumber or other similar material; and our invention consists of certain new and useful features of construction which will be hereafter described and will be specifically defined in the claims.

In the accompanying drawings forming a part of this specification, Fig. 1 is a perspective of a cross cut sawing machine embodying our invention. Fig. 2 is a vertical section on line 2—2 of Fig. 1. Fig. 3 is an enlarged transverse section on line 3—3 of Fig. 2 looking downward, as indicated by the arrow, the outer portion of the figure being broken away.

Referring to the drawings, A represents the upper portions of a pair of vertically disposed frame members, each of which has an integral horizontally disposed base portion B extended out laterally from the lower end of each of the frame members, the upper and lower edges of these base portions being approximately parallel with each other, their vertical dimensions being considerably less than their horizontal dimensions, and their outer ends B' being adapted to contact with suitable supporting means. These frame members are spaced apart and are held in a substantially parallel relation by means of braces, such as that shown by C, or otherwise as desired. Bolts, such as that shown by D, may also be used above and below to hold the members together.

The upper ends of these frame members are preferably inclined to one side in the same direction as the base portions B are extended, so as to stand in an approximately vertical position over the junction of the base portions with the adjoining edges of the upright portions. In the upper ends of these frame members, or connected thereto as will be hereafter explained, are bearings E in which are pivotally mounted the ends of a horizontally disposed shaft F. A vertically disposed pendant member G has its upper end connected to the central portion of the shaft F and a circular saw H is rotatably mounted in the usual manner in the lower end of the pendant member G, so as to be swung forward and backward in sawing.

The base portions B, besides holding the frame members in the proper position, will also furnish a convenient support for the material to be sawed. The vertical dimensions of the base portions being less than the horizontal dimensions and being approximately parallel above and below and their outer ends being suitably supported a platform I may be placed thereon to carry the material to be sawed without raising it too high or having it liable to tip over even when the frame is set on an upstanding bench or platform, for which location our sawing machine is mainly designed.

Our sawing machine is also designed to use an electric motor for the power to run the saw which, as represented by K, is connected to the saw by a belt L in the usual manner, and is mounted on the front side of the pendant member G, whereby its weight will automatically assist in swinging the member carrying the saw back from the material being sawed. It is also preferable that the motor be adjustably secured to the member G and be provided with means such as the attaching plate M having a flange T with a thumb screw N, whereby the motor may readily be adjusted up or down on the member G to tighten or loosen the belt as may be required. To hold the motor securely in place on the member G, the attaching plate should be provided with a clamping member O connected to the plate by bolts P, as most plainly shown in Fig. 3. It is also advisable that compression coiled springs Q should be used on these bolts substantially as shown, to secure a more easily adjusted and a more efficient attachment to the member G.

When sawing lumber or other material of varying thickness, it may be advantageous to have the saw set at different distances above the platform I. This is especially necessary in cutting grooves in the material, in which cases the saw must be far enough above the platform I to not cut entirely through the material in which the grooves are to be made. To provide for such contingencies we have arranged for an up and down adjustment of the saw by placing adjustable attachments R on the upper inclined ends of the members A having the bearings E in which the ends of the shaft F are inserted. These attachments are secured to the upper ends of the members A by bolts S which are passed through vertical slots therein, whereby the attachments may be adjusted up or down to suit requirements, and the saw may thereby be adjusted to different distances above the platform I.

The electric connection to the motor may be made in any suitable manner, and in Fig. 2 a section of a wire U is shown connected to the motor for this purpose. The entire arrangement of our invention is extremely simple and very effective in operation, the principal object of the invention being accomplished by placing the horizontally disposed parts of the frame, which carry the material to be sawed, at the extreme lower ends of the upright portion of the frame which carries the saw, and arranging it to rest upon the support which will hold the machine in position. It is preferably made portable, as shown in the drawings, so it may be readily moved from place to place, and be set where it will be the most convenient.

What we claim as new, and desire to secure by Letters Patent is—

1. In a device of the character described, a pair of vertically disposed frame members spaced apart and connected together in parallel relation, a bearing in each of the upper ends of the frame members, the ends of a horizontally disposed shaft pivotally mounted in said bearings, a pendant member having its upper end connected to said shaft, a circular saw mounted in the lower end of said pendant member, and an electric motor, having operative connection with the saw, mounted on the pendant member, said motor being adjustably connected to the pendant member by a plate having a clamping member connected thereto by bolts provided with springs and a flange threadedly receiving an adjusting screw carried by the pendant, substantially as and for the purpose set forth.

2. In portable sawing machines, the combination of a pair of frame members spaced apart and held in approximately parallel relation to each other, said members being of integral construction, and each member having a horizontally disposed base and an upward vertically extended portion, the upper and lower edges of said horizontal base being substantially parallel with each other, and their outer lower ends being adapted to come in contact with a suitable support to assist in holding the machine in position; means connected to the upper ends of the vertically extended portions of the frame to support and permit the operation of a swinging circular saw, and the horizontally extended lower portions of the frame members being adapted to support the material to be sawed.

LORENZO R. HESTON.
ABNER L. ANDERSON.